Oct. 6, 1953  J. A. BOMBARDIER  2,654,639
TENSIONING DEVICE FOR TRACTORS
Filed Nov. 24, 1952  2 Sheets-Sheet 1

Inventor:
Joseph Armand Bombardier
By
Attorney

Oct. 6, 1953    J. A. BOMBARDIER    2,654,639
TENSIONING DEVICE FOR TRACTORS
Filed Nov. 24, 1952    2 Sheets-Sheet 2
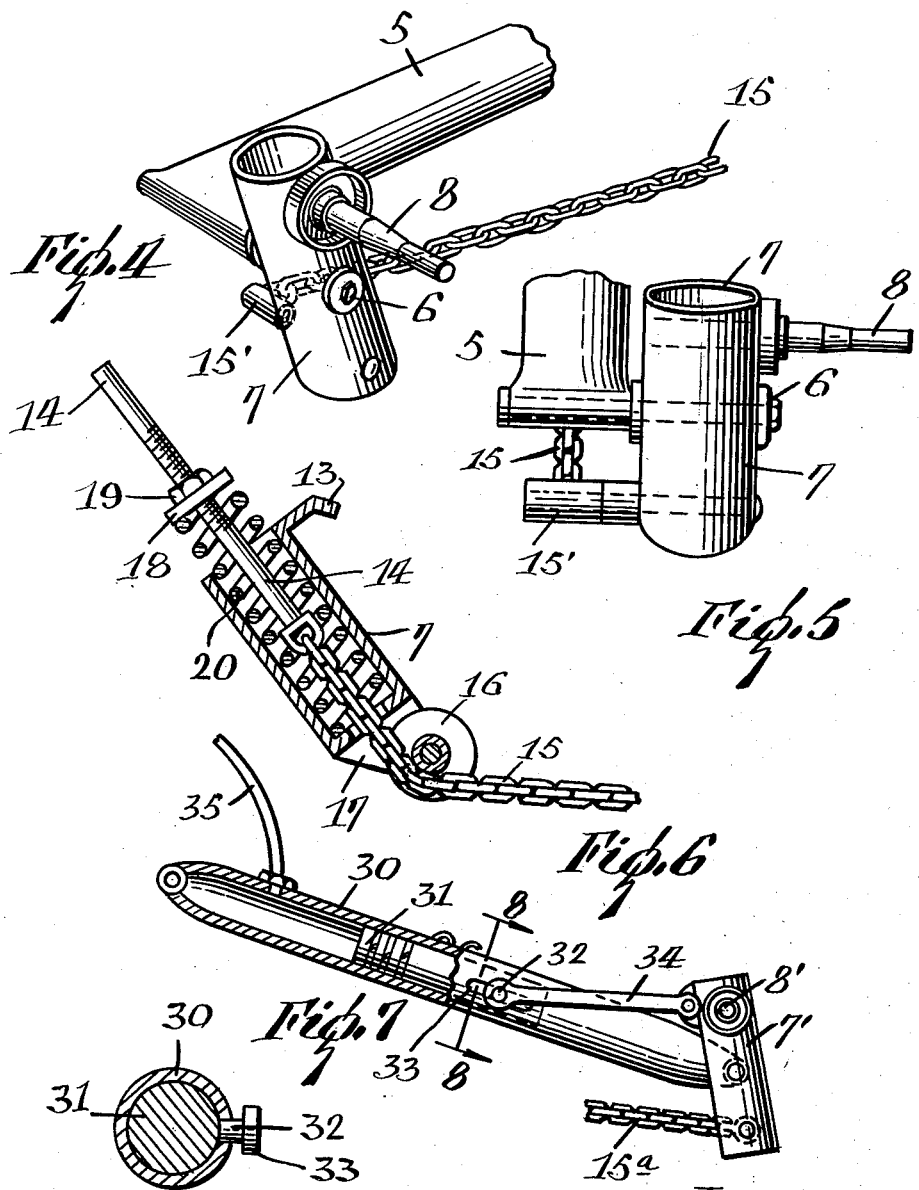

Patented Oct. 6, 1953

2,654,639

UNITED STATES PATENT OFFICE 2,654,639

TENSIONING DEVICE FOR TRACTORS

Joseph Armand Bombardier, Valcourt, Quebec, Canada

Application November 24, 1952, Serial No. 322,176
In Canada October 30, 1952

9 Claims. (Cl. 305—8)

The present invention pertains to a novel device for regulating the tension of the endless traction belts on the wheels of a tractor.

As known in the art and as indicated below, there are operating conditions requiring regulation of the tension of the belts. In the present invention, the regulation is made by adjusting the distance between the wheel axles. Thus, not only are the specific driving requirements satisfied, but the load is properly distributed between the wheels on the axles.

The principal object of the invention is to obtain from a sole spring a constant tension on the endless traction belts and a pressure of the idler wheel on the ground.

Another object of the invention is to provide a simple mechanism, easily operated by the driver, for making the described adjustment. Another object is to provide a rugged and economical construction for the purpose set forth.

In the accomplishment of these objects, a bar is pivoted at one end to one of the axles, preferably the drive axle, and extends longitudinally of the belts. On the other end of the bar is pivoted a rocker member carrying the other axle, at a vertical distance from the pivot point of the rocker. Thus, if the rocker member is swung on its pivot, the distance between the axles is varied.

In one form of the invention the rocker is swung by means of a chain attached thereto. The adjustment is made by means of an adjustable spring acting on the chain.

In another embodiment, the aforementioned bar is a cylinder containing a piston, and the piston is linked to the rocker member. A fluid line, controlled by the driver, is connected to the cylinder and regulates the position of the piston, whereby a corresponding adjustment of the rocker member is made.

Figure 1:
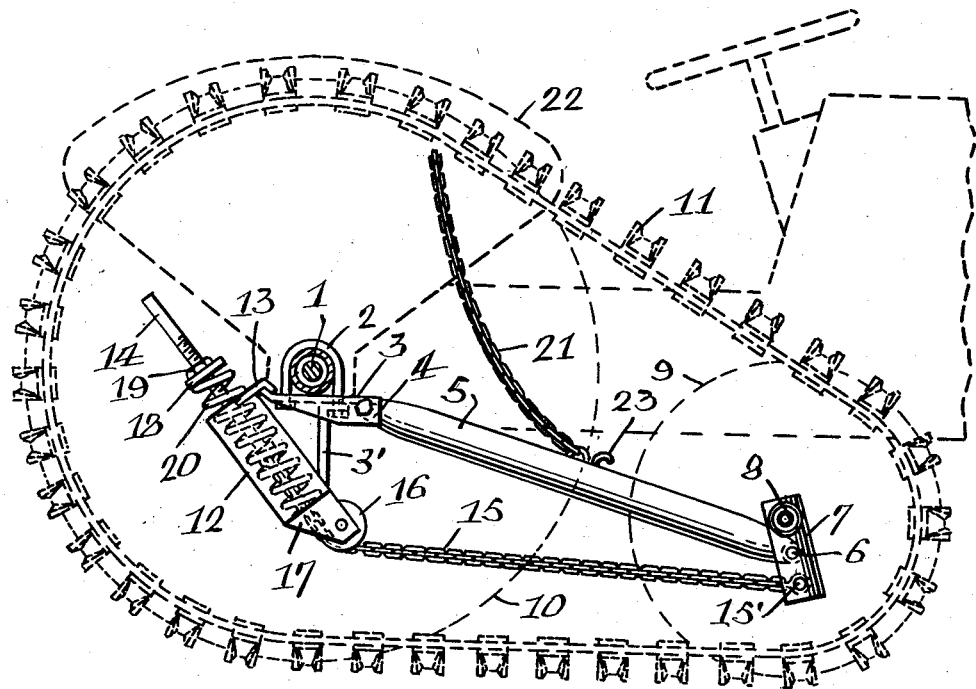
Figure 2:
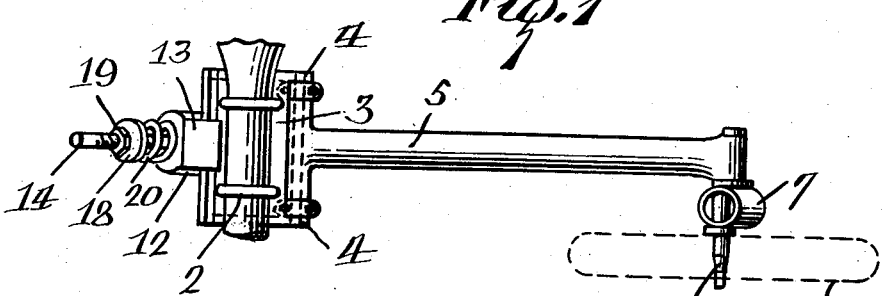
Figure 3:
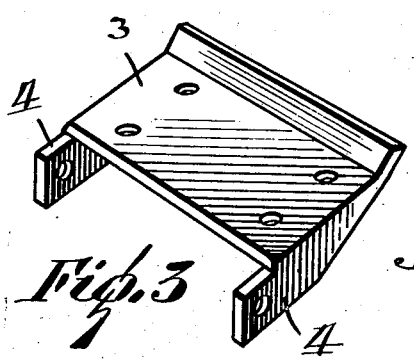

The invention is fully disclosed by way of example in the following description and in the accompanying drawings in which:

Figure 1 is a side elevation of the device;
Figure 2 is a plan view thereof;
Figure 3 is a detail perspective view of a detail;
Figure 4 is another detail perspective view;
Figure 5 is a detail plan view;
Figure 6 is a detail vertical section;
Figure 7 is an elevation, partly in section, of a modification; and
Figure 8 is a section on the line 8—8 of Figure 7.

Reference to these views will now be made by use of like characters which are employed to designate corresponding parts throughout.

In Figure 1 is shown the drive axle 1 of a tractor which is to be adapted for a half track drive. By means of a pair of shackles 2, a plate 3 is bolted beneath the axle. The plate has a pair of forward ears 4 (Figure 3) between which is pivoted the head of a T-bar 5. To the forward or free end of the bar is pivoted at 6 a rocker tube 7, lying in a vertical plane. One end of the tube 7, preferably that above the pivot pin 6, carries the axle 8 of the idler wheels 9. The drive wheels 10 on the axle 1 are joined to the respective idlers 9 by traction belts 11.

A guide or cylinder 12 is suspended from the plate 3 by a lip 13 secured to the plate 3 and is braced by a rod 3'. A stem 14 is slidable axially in the cylinder and has its lower end joined by a chain 15 to a pin 15' on the end of the rocker 7 opposite the axle 8. The chain is guided on a pulley 16 journalled between ears 17 on the cylinder 12. A washer 18 on the stem 14 is adjustably backed by a nut 19 threaded on the stem. A compressed coil spring 20 in the cylinder 12 surrounds the stem, bearing on the bottom of the cylinder and against the washer 18.

A chain 21 extends from the bar 5 to a body part 22 to prevent the wheel 9 from dropping too far. The chain may be shortened, when desired, by being attached at a selected link to a hook 23 on the bar.

In the use of the device, the belts 11 are normally maintained at a relatively low tension in order to drive freely and without undue binding of the parts. When greater tension is necessary to avoid slipping, such adjustment is made by turning the nut 19 down on the stem 14, whereby the spring 20 is further compressed to draw the stem 14 upward, pull the chain 15 and throw the axle 8 forward and thereby tighten the belts 11. A reverse adjustment of the nut 19 relaxes the belts as desired.

In the modification shown in Figures 7 and 8, the bar 5 of Figures 1–6 is replaced by a cylinder 30 in which is mounted a piston 31. A rocker tube 7' is pivoted to the forward end of the cylinder or bar as previously described and carries the idler axle 8' and the chain connecting pin 15a. A pin 32 on the piston 31 extends through a slot 33 in the cylinder and is joined to the rocker 7' by a link 34. A tube 35 governs the flow of fluid to the cylinder at the face of the piston, and flow in the tube is regulated by suitable means within reach of the driver.

Although specific embodiments of the invention have been illustrated and described, it will be understood that various alterations in the details of construction may be made without departing from the scope of the invention as indicated by the appended claims.

What I claim is:

1. In a tractor, a drive axle, a bar having one end pivoted thereto, a rocker member pivoted on the other end of said bar and extending in a vertical plane, another axle carried by said bar and positioned at a vertical distance from the pivot of said member, and means for adjusting said member on its pivot.

2. In a tractor, a drive axle, a bar having one end pivoted thereto, a rocker member pivoted on the other end of said bar and extending in a vertical plane, another axle carried by said bar and positioned at a vertical distance from the pivot of said member, a chain attached to said member, and means for adjusting the tension on said chain.

3. In a tractor, a drive axle, a bar having one end pivoted thereto, a rocker member pivoted on the other end of said bar and extending in a vertical plane, another axle carried by said bar and positioned at a vertical distance from the pivot of said member, a chain attached to said member at an opposite vertical distance from said pivot, and means for adjusting the tension on said chain.

4. In a tractor, a drive axle, a bar having one end pivoted thereto, a rocker member pivoted on the other end of said bar and extending in a vertical plane, another axle carried by said bar and positioned at a vertical distance from the pivot of said member, a chain attached to said member, a guide secured to said axle, a chain extending from said member into said guide, a stem in said guide, a washer adjustable on said stem, said chain being also connected to said stem, and a spring between said guide and washer.

5. In a tractor, a drive axle, a bar having one end pivoted thereto, a rocker member pivoted on the other end of said bar and extending in a vertical plane, another axle carried by said bar and positioned at a vertical distance from the pivot of said member, a chain attached to said member at an opposite vertical distance from said pivot, a guide secured to said axle, a chain extending from said member into said guide, stem in said guide, a washer adjustable on said stem, said chain being also connected to said stem, and a spring between said guide and washer.

6. In a tractor, a drive axle, a bar having one end pivoted thereto, a rocker member pivoted on the other end of said bar and extending in a vertical plane, another axle carried by said bar and positioned at a vertical distance from the pivot of said member, a chain attached to said member, said bar being hollow, a piston in said bar and linked to said member, and means for adjusting the position of said piston in said bar.

7. In a tractor, a drive axle, a bar having one end pivoted thereto, a rocker member pivoted on the other end of said bar and extending in a vertical plane, another axle carried by said bar and positioned at a vertical distance from the pivot of said member, a chain attached to said member, said bar being hollow, a piston in said bar and linked to said member, and a fluid line to the interior of said bar, and means for adjusting the position of said piston in said bar.

8. In a tractor, a drive axle, a bar having one end pivoted thereto, a rocker member pivoted on the other end of said bar and extending in a vertical plane, another axle carried by said bar and positioned at a vertical distance from the pivot of said member, a chain attached to said member, said bar being hollow, a piston in said bar, said bar having a longitudinal slot, said piston being linked through said slot to said member, and means for adjusting the position of said piston in said bar.

9. In a tractor, a drive axle, a bar having one end pivoted thereto, a rocker member pivoted on the other end of said bar and extending in a vertical plane, another axle carried by said bar and positioned at a vertical distance from the pivot of said member, a chain attached to said member, said bar being hollow, a piston in said bar, said bar having a longitudinal slot, said piston being linked through said slot to said member, and a fluid line to the interior of said bar, and means for adjusting the position of said piston in said bar.

JOSEPH ARMAND BOMBARDIER.

References Cited in the file of this patent

UNITED STATES PATENTS

| Number | Name | Date |
| --- | --- | --- |
| 1,368,652 | Pennington et al. | Feb. 15, 1921 |
| 1,659,297 | Langenfeld | Feb. 14, 1928 |
| 2,346,351 | Bombardier | Apr. 11, 1944 |
| 2,587,813 | Bombardier | Mar. 4, 1952 |